United States Patent Office 3,320,236
Patented May 16, 1967

1

3,320,236
REACTION PRODUCTS OF POLYMERIC DI-
ALDEHYDE POLYSACCHARIDES WITH p-
AMINOSALICYLATES
Galen Franklin Collins, Bristol, Tenn., and Lawrence John
Daher, Elkhart, Ind., assignors to Miles Laboratories,
Inc., Elkhart, Ind., a corporation of Indiana
No Drawing. Filed Mar. 7, 1963, Ser. No. 263,418
10 Claims. (Cl. 260—233.3)

This invention relates to an improved therapeutic compound and method of preparing and, in particular, to a novel compound useful in the treatment of tuberculosis, scleroderma and dermatomyositis. More particularly, this invention is concerned with novel therapeutic complex reaction products of polymeric dialdehyde polysaccharides with p-aminosalicylates.

p-Aminosalicylic acid has been known to offer certain benefits in the treatment of tuberculosis, particularly affecting the tubercule bacillus. It is well known that salicylic acid derivates increase the oxygen consumption of the tubercule bacillus which is accompanied by inhibition in growth and multiplication of the bacillus. Lehmann et al. reported in Lancet (1946), 6384, that p-aminosalicylic acid, commonly referred to as PAS, was the most effective compound, in a group of related compounds tested, for inhibiting the growth and multiplication of the bacillus. The use of the compound, per se, in clinical treatment is, however, often accompanied by one or more undesirable and harmful side effects such as nausea, vomiting, diarrhea, drug fever, pruritus, dermatitis, jaundice, to mention a few.

A number of salts and derivatives, for example, sodium, potassium, calcium salts, ferrous and cuprous chelates, of p-aminosalicylic acid have been proposed for use but have not been successful in eliminating the harmful side effects of the compound in even average dosages. Treatment of tuberculosis, scleroderma and dermatomyositis, in the usual case, requires large doses and/or prolonged treating regimens. However, the undesirable and harmful side effects such as gastric irritation which frequently arise in treatments with p-aminosalicylic acid and the known derivatives necessitate premature stoppage of treatment and/or reduction of effective dosages to the end that treatment is prolonged or rendered completely ineffective.

In addition to the foregoing disadvantages, the known derivatives have an unpleasant taste and are rapidly excreted by the body.

In accordance with this invention, a non-toxic therapeutic complex is prepared comprising the reaction product of p-aminosalicycilc acid or its salts with a polymeric dialdehyde polysaccharide such as dialdehyde starch. The p-aminosalicylic acid-dialdehyde polysaccharide complex of the instant invention provides the advantages of being substantially odorless and tasteless. In addition, the complex of this invention is stable and highly soluble in distilled water.

A major advantage offered by the novel therapeutic composition of this invention is that the complex may be administered over prolonged periods of time without the harmful side effects characteristic of known p-aminosalicylic acid-containing compositions by providing a sustained release of the active ingredient, which permits

2 the use of effective doses of PAS over longer periods of time in instances where the patient's response may be slower while permitting the use of smaller doses in conditions where extreme sensitivity might develop rapidly were larger doses to be employed.

This invention additionally provides a novel process for the production of a physiologically reversible therapeutic compound from polymeric dialdehyde polysaccharides and p-aminosalicylic acid derivatives which retains the pharmacological activity of p-aminosalicylic acid without the attendant disadvantages of the compound per se. A further advantage achieved by the novel complex of this invention is improved texture of the drug which results in ease of formulation.

Other objects and advantages provided by the compositions and methods of this invention will become obvious from the discussion hereinafter.

The dialdehyde polysaccharides used in the process of this invention may be prepared by the well-known process of oxidation of polysaccharides with periodic acid. This preparation is illustrated by the conversion of starch to dialdehyde starch using periodic acid as the oxidizing agent in accordance with the below set out equation wherein "x" stands for the number of repeating units in a molecule which may range from 20 to several thousand.

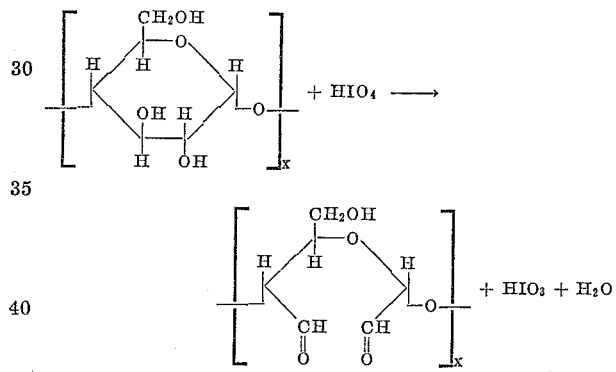

The dialdehyde polysaccharides used in this process may be the dialdehyde rerivatives of any polysaccharide such as corn, wheat, tapioca, or potato starches, celluloses, dextrans, algins, inulin or others. Of these polysaccharides, the dialdehyde derivatives of starch, known generically as dialdehyde starch, are the best known and most often used. However, when it is desired to have derivatives of other polysaccharides, these may also be used. As mentioned above, the dialdehyde polysaccharides are in various stages of oxidation. In the preferred embodiment, the polymers are from about 50–100% oxidized. In other words, 50 to 100 of each 100 of the original anhydroglucose units have been converted to dialdehyde units by periodate oxidation.

The p-aminosalicylic acid used in the process of this invention is manufactured by any of the commercially used techniques, for example, by diazotization and subsequent reduction of 4-nitroanthranilic acid or by a Kolbe reaction on m-aminophenol.

Studies have shown that the functional unit of the oxidized anhydroglucose units react as two free carbonyl groups, which grouping, under the proper conditions, will condense in approximately equimolecular ratio with a compound which reacts with a free carbonyl group.

Formation of the reaction products of this invention are theorized to proceed as illustrated in the following equation:

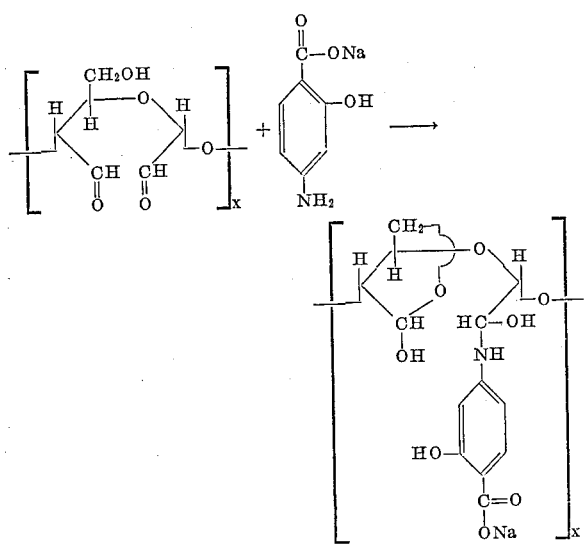

The product may lose water to give the corresponding

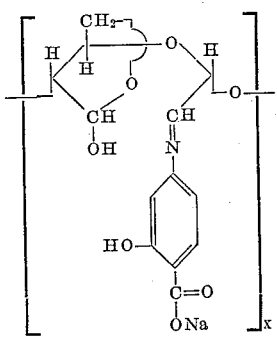

The therapeutic complexes of this invention may be prepared by simply reacting p-aminosalicylic acid or a therapeutically acceptable non-toxic salt thereof, such as sodium p-aminosalicylate, with a dialdehyde polysaccharide such as dialdehyde starch at any convenient temperature and pH.

The reaction conditions are, in general, not critical, but certain preferred reaction conditions should be observed for best results. The dialdehyde polysaccharide is preferably used in excess of the stoichiometric requirements to insure that most if not all of the salicylate is reacted with the carbonyl groups of the dialdehyde polysaccharide. As much as a 2:1 molar ratio of dialdehyde polysaccharide to salicylate may be used, but only a slight excess over a 1:1 ratio has been found to suffice.

Because of the relative insolubility of the dialdehyde polysaccharide it is preferred to use the dialdehyde polysaccharide in the form of an aqueous dispersion. Suitably a dispersion in a concentration of about from 1% to 25% may be used. Preferably the dispersion has a concentration of about from 5% to 15%. If desired a salt such as sodium acetate or other buffer salts may be used to facilitate dispersion.

If the dialdehyde polysaccharide is dispersed prior to reaction with the salicylate, it is possible to conduct the reaction under generally mild conditions. For example the reaction may be conducted at a temperature of about from room temperature (22° C.) to 60° C. in as short a time as about 20 min. If desired the reaction mixture may be stirred for extended periods of time, such as for about from 2 hours to 8 hours to assure thorough reaction.

If the dialdehyde polysaccharide is not dispersed prior to reaction with the salicylate more severe reaction conditions must be used. It has been found, for example, that sodium p-aminosalicylate can be reacted with dialdehyde polysaccharides in slurry in a suitable refluxing solvent such as benzene, i.e., at a temperature of 80° C.

The salicylate-dialdehyde polysaccharide complex may be recovered from the reaction mixture by any convenient means such as filtration or centrifugation and then dried and further purified if desired by means of any suitable technique. In some cases, depending upon the reaction conditions used for conducting the reaction the product precipitates from the reaction mixture without any further treatment. In other instances it may be necessary to facilitate the precipitation by means of a pH adjustment or use of a solvent which will cause the product to precipitate, such as acetone.

The product, a powder or crystalline solid, may vary in color from pure white to dark brown depending upon the reaction conditions used and the extent of purification. It is stable in air, soluble in water, odorless and tasteless.

The invention will be better understood by reference to the following examples which, however, are included for purposes of illustration and are not to be construed as unduly limiting the scope of this invention which is defined in the claims appended hereto.

*Example 1*

27.4 g. (0.141 mole) of dialdehyde starch (90.4% oxidized; 8.6% moisture) and 24.6 g. (0.116 mole) of sodium p-aminosalicylate dihydrate was slurried in 100 ml. of dry benzene in a 500 ml. three-necked flask equipped with a stirrer, Barret trap and condenser. The mixture was refluxed and stirred for a period of 5 hours during which time 5.0 ml. of water separated in the trap. After cooling the mixture to room temperature, the pale yellow solid was collected, washed with dry benzene and dried to constant weight in a vacuum oven. Analyses, including infra-red spectra, showed that a linkage between the compounds had taken place. The total nitrogen and free aldehyde content showed that sodium PAS had added to half of the available aldehyde groups. The resulting complex was a pale yellow to light tan powder having a bland taste. The complex was soluble in water to the extent of 1 g. complex to 2.85 g. of water.

*Example 2*

2.7 g. of PAS in 100 ml. of distilled water was adjusted to a pH of 5.2 with sodium hydroxide. The pH of the solution was then adjusted to 0.5 with concentrated hydrochloric acid and filtered. 100 ml. of a 5% aqueous dispersion of dialdehyde starch (91% oxidized) was adjusted to pH 0.5 with concentrated hydrochloric acid and filtered. The PAS filtrate and the dialdehyde starch filtrate were then mixed at room temperature for approximately 20 minutes. The precipitate formed was filtered and air dried. The product obtained was a very hard, brittle, reddish-brown colored product.

*Example 3*

2.72 g. of PAS was added with stirring to 100 ml. of a 5% aqueous dispersion of dialdehyde starch (57% oxidized) at room temperature. The compound was precipitated by adjusting the pH of the mixture to 7.0 with solid sodium acetate crystals. The precipitate was then washed with a concentrated aqueous sodium acetate solution, filtered and air dried for several days, obtaining a friable, off-white colored material.

Example 4

2.72 g. sodium PAS was mixed with 100 ml. of a 5% aqueous dispersion of dialdehyde starch (57% oxidized) and the pH of the mixture adjusted to pH 8.2 with sodium hydroxide. To the solution formed was added 300 ml. of acetone, producing a precipitate which was filtered and air dried. The product obtained was a tan colored material.

Example 5

A 10% dispersion of dialdehyde starch was prepared by dispersing 10.0 g. of dialdehyde starch (90% oxidized) in 90 g. of water containing 1.0 g. of sodium acetate at 60° C. 11 g. (0.05 mole) of sodium PAS dihydrate was added to the stirred, hot (60° C.) dispersion. The resulting mixture was stirred while it cooled slowly to room temperature. After two hours the solution was diluted with ten volumes of acetone causing precipitation of a gum. Trituration of the gum with fresh acetone induced solidification. After collecting and washing the solid with fresh acetone, it was dried in the vacuum oven. The solid weighed 14.1 g. and contained 5.36% water. The compound contained 2.91% nitrogen.

Example 6

Example 5 was repeated in detail with the exception of increasing the amount of dialdehyde starch to 16.0 g. The dried solid weighed 15.7 g. and contained 6.47% moisture. The adduct contained 3.39% nitrogen.

Example 7

11 g. of sodium PAS was added to a stirred slurry of 10.0 g. of dialdehyde starch in 100 ml. of water. During seven hours stirring at room temperature the solids disappeared and a thick jelly-like mass formed. The addition of five volumes of acetone precipitated a crystalline solid which weighed 16.7 g. after drying and contained 6.72% water. The nitrogen analysis was 2.73%.

The salicylate-dialdehyde polysaccharide polymeric complexes of the present invention may be tabletted by compression of the product itself or if desired may be used with any of the normal solid or liquid pharmaceutical carriers suitable for oral administration. It is to be understood that the term "pharmaceutical carrier" as used in the specification and claims of this invention is meant to include all of the usual pharmaceutical carriers, filler substances and additives suitable for oral administration such as lactose, starch, tricalcium phosphate, aromatic elixir U.S.P., potassium biphosphate, sodium phosphate, polysorbate, sorbitan monolaurate, thiomersol, distilled water, etc. Where the complex of this invention is internally administered via capsules, no binders, lubricants, fillers, etc. are required.

The following example illustrates the in vitro testing of the salicyclate-dialdehyde polysaccharide complexes of this invention.

Example 8

Small quantities of the reaction product of p-aminosalicylic acid with dialdehyde starch and free PAS were placed in Simulated Gastric Fluid U.S.P., and 1 drop of ferric chloride test solution U.S.P. added to each sample. The sample of the free PAS gave a red color immediately upon addition of the ferric chloride while the samples of the PAS-dialdehyde polysaccharide polymeric complex gave no coloration initially. On standing at room temperature for several hours, these samples developed a light pink coloration.

The release of free PAS from the reaction product was established by means of dialysis. The presence of free dialyzed PAS in the dialysate was shown by its color reaction with ferric chloride test solution U.S.P. The dialysis was conducted as follows:

1 to 2 g. of the PAS-dialdehyde starch reaction product was dissolved in 50 ml. of an aqueous sodium bicarbonate solution having a pH of 7.4. Separate samples were also prepared containing 1 to 2 g. of the reaction product in 50 ml. of Simulated Gastric Fluid U.S.P. Each of the solutions was placed in a length of cellophane dialysis tubing and submerged in a quantity of its respective dissolving or dispersing solution. The systems were allowed to remain at room temperature for 2 days.

The reaction products in Simulated Gastric Fluid showed no visible signs of dissolving even after standing for several days. The samples placed in the sodium bicarbonate solution substantially went into solution after several hours. The exterior solutions were tested with ferric chloride testing solution, U.S.P for the presence of free PAS. All of the exterior solutions showed the presence of free PAS although the color reactions from the system containing Simulated Gastric Fluid were extremely weak and did not increase in intensity during the testing period. The extremely weak positive color test developed approximately 3 hours after being set up. The exterior sodium bicarbonate solutions showed a progressive color intensity throughout the two day period of standing. The exterior solutions of sodium bicarbonate gave a positive color test approximately 1½ hours after being set up.

The foregoing example clearly shows that free PAS is released from the PAS-dialdehyde starch reaction product or complex only after extended periods of exposure to simulated gastric fluid. The in vitro evidence of sustained release is further shown in the following example.

Example 9

Accurately weighed 0.5 g. samples of the sodium PAS-dialdehyde starch reaction product and free sodium PAS were each sealed in small packets of Whatman #41 filter paper. The packets were heat sealed after application of a heat-sensitive adhesive. Each packet was then placed in a one liter round bottom flask containing 500 ml. of Simulated Gastric Fluid U.S.P. The fluid was stirred constantly with a mechanical stirrer which passed through the neck of the flask by means of a mercury seal. The flask was mounted in a water bath maintained at 37° C. At the end of 1 hour and 20 minutes half of the fluid was removed and replaced by equal quantities of intestinal fluid. At the end of 2 hours and 40 minutes all of the fluid was replaced by 500 ml. of fresh intestinal fluid. Small samples of the fluid were removed by means of a pipette at varying timed intervals up to the end of a 9 hour period from commencing the experiment. Each time a sample was removed an equal volume of fluid was placed into the flask to maintain a constant volume. The samples removed were assayed for sodium PAS content in the following manner:

A 5 ml. quantity of the solution to be assayed was placed in a 250 ml. volumetric flask containing 12.5 ml. of concentrated pH 7 buffer (prepared by dissolving 34 g. of c.p. anhydrous $KH_2PO_4$ in 136 ml. of 1 N NaOH and diluting to 1000 ml. with distilled water). This was diluted to volume with distilled water and mixed well. A blank was prepared by diluting 5 ml. of concentrated pH 7 buffer to 100 ml. with distilled water. The absorbance of the sample solution was determined at 265 and 299 m$\mu$ in a 1.0 cm. quartz cell by means of a Beckman DU spectrophotometer using the blank solution (diluted pH 7 buffer) as the reference liquid.

Calculations $$X = A-265\ (136.1) = \%\ \text{NaPAS based on absorbance at 265 m}\mu$$

$$Y = A-299\ (208.8) = \%\ \text{NaPAS based on absorbance at 299 m}\mu$$

$$\frac{X+Y}{2} = \%\ C_7H_6NNaO_3\ \text{on anhydrous basis}$$

The rate of passage of sodium PAS is shown in Table 1.

TABLE 1

| Time, hours | Release of Sodium PAS | |
|---|---|---|
| | From Sodium PAS-Dialdehyde Starch Reaction Product, Percent | From Free Sodium PAS Sample, Percent |
| 2.5 | 4 | 100 |
| 4 | 29 | |
| 5.5 | 40 | |
| 7 | 83 | |
| 9 | 100 | |

These data clearly show the sustained release of sodium PAS from the reaction products of sodium PAS with dialdehyde starch. Other dialdehyde polysaccharides such as dialdehyde cellulose and dialdehyde guar gum may be similarly used.

The following example illustrates the sustained release of the salicylate-dialdehyde polysaccharide reaction products of this invention as demonstrated in vitro.

*Example 10*

Free sodium PAS and sodium PAS-dialdehyde starch were administered to dogs for comparative purposes to show the sustained release of the latter compound. The free sodium PAS was administered by intubation at a dosage level of 100 mg./kg. Blood samples were taken at 0, ½, 1, 2, 4 and 8 hours. The free PAS content in whole blood was determined by a modified Bratton-Marshall method. Way, E. L., Smith, P. K., Howie, D. L., Weiss, R. and Swanson, R. J. Pharmacol. Exptl. Therap. 93, 368 (1948). Approximately 10 days after the administration of free sodium PAS, the sodium PAS-dialdehyde starch reaction product or complex was administered to the same dogs with the dosage level being the same in regard to sodium PAS content. Blood samples were taken on the same schedule as in the former experiment. The results of the test are shown in Table 2.

TABLE 2

| Time, hours | Blood Level of PAS, mg. per Liter | | | |
|---|---|---|---|---|
| | Dog #1 | | Dog #2 | |
| | Free NaPAS | Complex | Free NaPAS | Complex |
| 0 | 0 | 0 | 0 | 0 |
| ½ | 120 | 17 | 105 | 18 |
| 1 | 107 | 13 | 98 | 17 |
| 2 | 63 | 11 | 75 | 15 |
| 4 | 39 | 12 | 62 | 16 |
| 8 | 8 | 8 | 28 | 14 |

In addition to the foregoing tests the acute toxicity ($LD_{50}$) of sodium PAS-dialdehyde starch was determined orally in rats and found to be 12100 mg./kg. (no confidence limits). By way of comparison the Merck Index, Seventh Edition, page 60, gives the PAS $LD_{50}$ orally in mice of 4 g./kg. Sodium PAS has an $LD_{50}$ in the range of about from 6 g./kg. to 10 g./kg. as determined orally in the rat. Thus it may be seen that the sodium PAS-dialdehyde starch reaction product of this invention is considerably less toxic than either PAS or sodium PAS.

It is obvious that certain changes may be made in the above compositions and methods without departing from the spirit and scope of the invention, and it is intended that all matter contained in the foregoing description shall be interpreted as illustrative and not in a limiting sense. It is also understood that other modifications may be made without departing from the spirit and scope of the appended claims.

What is claimed is:

1. A reaction product of a p-aminosalicyalte with a polymeric dialdehyde polysaccharide having about from 50% to 100% of the original anhydroglucose units present in oxidized form, said reaction product formed by reacting one mole part of said p-amino salicylate with from one to two mole parts of said dialdehyde polysaccharide at a temperature of about from 22° C. 80° C. for a period of about from 20 minutes to 8 hours.

2. A product according to claim 1 wherein the dialdehyde polysaccharide is dialdehyde starch.

3. A product according to claim 1 wherein the salicylate is p-aminosalicylic acid.

4. A product according to claim 1 wherein the salicylate is sodium p-aminosalicylate.

5. A method useful in the treatment of tuberculosis comprising administering to the tubercular patient a therapeutically effective dosage of a reaction product of a p-aminosalicylate with a polymeric dialdehyde polysaccharide.

6. A method according to claim 5 wherein the dialdehyde polysaccharide is dialdehyde starch.

7. A method according to claim 5 wherein the salicylate is p-aminosalicylic acid.

8. A method according to claim 5 wherein the salicylate is sodium p-aminosalicylate.

9. A process for the preparaton of a reaction product of sodium p-aminosalicylate with a polymeric dialdehyde polysaccharide which comprises refluxing sodium p-aminosalicylate with a dialdehyde polysaccharide in a mole ratio of about from 1:1 to 1:2 in benzene for a period of about from 2 hours to 8 hours and recovering from the reaction mixture a reaction product of sodium p-aminosalicylate with a dialdehyde polysaccharide.

10. A process according to claim 9 wherein the dialdehyde polysaccharide is dialdehyde starch.

References Cited by the Examiner

UNITED STATES PATENTS

| 23,947 | 2/1955 | Fox | 167—65 |
| 2,849,369 | 8/1958 | Muset | 167—65 |
| 3,085,085 | 4/1963 | Slager et al. | 260—209 |
| 3,086,969 | 4/1963 | Wismer et al. | 260—209 |
| 3,099,573 | 7/1963 | Borchert | 117—62.2 |

FOREIGN PATENTS 775,485  5/1954  Great Britain.

LEON J. BERCOVITZ, *Primary Examiner.*

FRANK CACCIAPAGLIA, Jr., *Examiner.*

R. W. MULCAHY, M. J. COHEN, *Assistant Examiners.*